United States Patent [19]
Frank et al.

[11] 3,889,555
[45] June 17, 1975

[54] INDEXING-TYPE WORK PLATFORM FOR MACHINE TOOLS

[75] Inventors: Rudolf Frank; Karl Emil Witzig, both of Leonberg; Armin Witzig, Hofingen, all of Germany

[73] Assignees: Rudolf Frank; Karl Emil Witzig, both of Leonberg, Germany

[22] Filed: Feb. 22, 1974

[21] Appl. No.: 444,946

[30] Foreign Application Priority Data
Feb. 23, 1973 Germany............................ 2308984

[52] U.S. Cl................................. 74/826; 74/813 L
[51] Int. Cl.......................................... B23b 29/32
[58] Field of Search................ 74/826, 813 L; 82/36

[56] References Cited
UNITED STATES PATENTS
| | | | |
|---|---|---|---|
| 3,242,771 | 3/1966 | Maier et al. ........................... | 74/826 |
| 3,651,698 | 3/1972 | Riedrich et al. .................. | 74/826 X |

Primary Examiner—Samuel Scott
Assistant Examiner—F. D. Shoemaker
Attorney, Agent, or Firm—Flynn & Frishauf

[57] ABSTRACT

To provide for accurate engagement at an indexed location of a machine tool work table with respect to a base, the work table is made to be lowered from its normal, work position, for example by means of a hydraulic piston-cylinder arrangement, to disengage locating projections and recesses formed on the work table and the base, respectively, the projections and recesses being so arranged that, from the base, they are at a downwardly directed face whereas, on the work table, they are at an upwardly directed face. These projections may, for example, be face or end gears, pyramidal or conical projections fitting into similarly shaped recesses, and the like. The indexing motion applied to the work table thus need not be highly accurate, the projection-recesses of the work table base arrangement providing for accurately positioned indexed location of the work table.

14 Claims, 4 Drawing Figures

INDEXING-TYPE WORK PLATFORM FOR MACHINE TOOLS

The present invention relates to an indexing-type work platform or work table in machine tools, in which work pieces can be sequentially worked by means of machine tools located at work stations, circumferentially disposed around the work table. The work table is rotatable about a vertical axis, in indexing movements, in order to bring the work piece under the respective machine tools.

Automatic-type machine tools with indexing work tables are increasingly used in order to efficiently work on similar work pieces, in mass production, particularly if the work involves cutting operations. High accuracy in work at the various work stations requires exact angular alignment of the work piece with respect to the work table, and hence of the work table with respect to the machine tool, so that, for example, holes to be drilled, to be bored, or otherwise cut are placed at accurately predetermined positions. It is, therefore, necessary that after each indexing motion of such an indexing-type work table, the angular alignment of the work table with respect to the machine tools, and hence with respect to the base, is ensured.

Indexing apparatus which accurately rotate a work table about a predetermined angular distance, and hold the work table in position, have been very expensive. The bearing for the indexing work table is highly loaded, particularly when the work piece is being cut. It has, therefore, previously been proposed to clamp the indexing work table during that time when the machine tools actually cut the work piece securely to the base, and to lock the work table to the base, in order to increase stability, strength and stiffness of the work table, and hence the work piece secured thereto, with respect to the machine tool (see German Pat. No. 769,566). Clamping the indexing work table to the base was done by means of a hydraulic piston which engaged hook-like clamps. The accuracy of the angular adjustment of the indexing, circular work table however, then, depends entirely on the accuracy of the indexing motor, or indexing drive of the work table itself.

It has also been proposed to fabricate indexing-type work tables by providing for clamping and locking engagement between the work table and the base which is set, or determined by one or more radially movable index bolts (see U.S. Pat. No. 2,392,169). Such movable bolts do not relieve the loading on the bearing of the circular work table, and the resulting accuracy with respect to angular adjustment of the work table is limited, since the interengagement of the sliding bolt and its matching engagement hole must have some play to permit free movement; additionally, the invariable play in the bearing is added.

It has also been proposed to lift a circular work table, as a whole, in order to release engagement of the work table from a base, then to rotate the work table, and then again drop the work table on the base, and in the process locking the work table to the base. Lifting the work table required either raising of all the machine tools, or certainly retracting all those tools which had been lowered to work position, before lift of the work table could be commenced. The danger is ever present that one of the machine tools does not raise sufficiently, so that it will be severely damaged by impact with the work table as it is being raised by hydraulic pressure. The repetitive raising and lowering of the work piece is time consuming; in rapidly indexing work tables, in which the individual operations themselves do not take much time, this loss in time may substantially detract from production efficiency.

It is an object of the present invention to provide an indexing type work table which permits exact angular alignment of the indexing work table with respect to the base — and hence with respect to machine tools secured thereto, in which the work time of the machine tools is independent of indexing motion of the work table, and in which the indexing itself is highly accurate.

SUBJECT MATTER OF THE PRESENT INVENTION

Briefly, the work table is maintained in normal working position by means of hydraulic pressure, which is dropped for indexing the work table, so that the work table is lowered from its normal working position during indexing movement. The base is formed with a downwardly facing engagement surface; the work table has an upwardly facing engagement surface, located beneath the engagement surface of the base. The surfaces are formed with matching recesses and projections, for example crown or face gear teeth, conical or pyramidal projections or recesses, and the like, to provide for accurate positioning of the work table with respect to the base, while requiring only approximate positioning by the indexing drive of the work table itself, the conical shape of the engagement surfaces (gears or projections) then providing for accurate angular location. The automatic centering of the work table with respect to the base, therefore, provides for accurate alignment while dropping the work table during indexing movement, from the working position, eliminates the necessity of idle retraction and feed time of the machine tools. Additionally, the bearing is less subject to loading during machining, since the work table is held in securely engaged position with respect to the base, by hydraulic pressure.

Dropping the work table during indexing movement permits locating the machine tools in immediately adjacent vicinity of the circumference of the work table itself (for attachment of machine tools to a base, see U.S. Ser. No. 442,403, filed Feb. 14, 1974, by K. E. Witzig and R. Frank, two of the three inventors hereof). The distance of the machine tool to the work pieces themselves may be held to a minimum, so that any feed movement of the cutting elements of the machine tools themselves can be practically eliminated, thus substantially decreasing the work time for any one work piece, since idling feed movement is eliminated. It is, for example, possible to so adjust the machine tool with respect to the work table, when in working position, that no feed movement of the cutting tool in vertical direction is necessary, which also substantially facilitates set-up of the machine tool itself.

The self-centering indexing arrangement is located so that it faces downwardly from the base. This is an advantageous position since the downward facing of the engagement surface on the base ensures protection against dirt, contamination by cooling fluids, chips carried therein, and the like.

The centering arrangement, preferably, is located radially outwardly of a central support post on a circular surface, coaxial with the central support post. The radial distance of the centering arrangement from the central support post may be suitably selected, which permits a large number of radially directed subdivisions, thus providing for high accuracy in angular positioning.

The central post, on which the work table itself is supported, can be connected to an associated drive arrangement which is coupled, or clutched when the work table is lowered. This automatically ensures that, when the work table is raised and the cutting tools operate on the work table, the work table itself is completely independent of any drive arrangement, and is clamped only by the centering arrangement. The coupling or clutching between the drive table and the drive therefor to provide indexing movement when the drive table has been lowered is, for example, a crown or face gearing located at a downwardly facing disk, or similar arrangement secured to the drive table which can engage a coaxially rotatably journalled drive wheel which is in engagement with the drive mechanism itself.

The lifting and lowering of the table is preferably effected by a coaxial hydraulic piston, guided in a cylinder located in the base of the machine tool, and holding the drive table in raised position when the work pieces are to be worked on. This arrangement has the advantage that, in case of emergency, or trouble, that is, if hydraulic pressure is lost, the work table will automatically be lowered, so that it is dropped from the machine tools so that the machine tools themselves cannot be damaged.

The central post, preferably, is rotatable with respect to the hydraulic piston. A thrust bearing preferably is located between the hydraulic piston and the central post, so that, during indexing, the hydraulic piston is not rotated in the associated cylinder, since the post can rotate independently. This additional bearing substantially reduces loading on the cylinder-piston seal of the hydraulic cylinder-piston arrangement to lift the work table.

The invention will be described by way of example with reference to the accompanying drawings, wherein.

The indexing work table 1 (FIG. 1) is only schematically shown. Various work pieces, not shown, can be clamped to the work table in well known manner, to be indexed and moved beneath, or in alignment with a plurality of machine tools, circumferentially arranged around the circumference of work table 1. The machine tools and their supports, themselves, have been omitted. The machine tools themselves may include, as known, various types of cutting machines such as drills, bores, cutting spindles, milling cutters and the like, held in suitable holders secured to the base of the indexing work table (see cross-referenced application Ser. No. 442,403).

Figure 1:
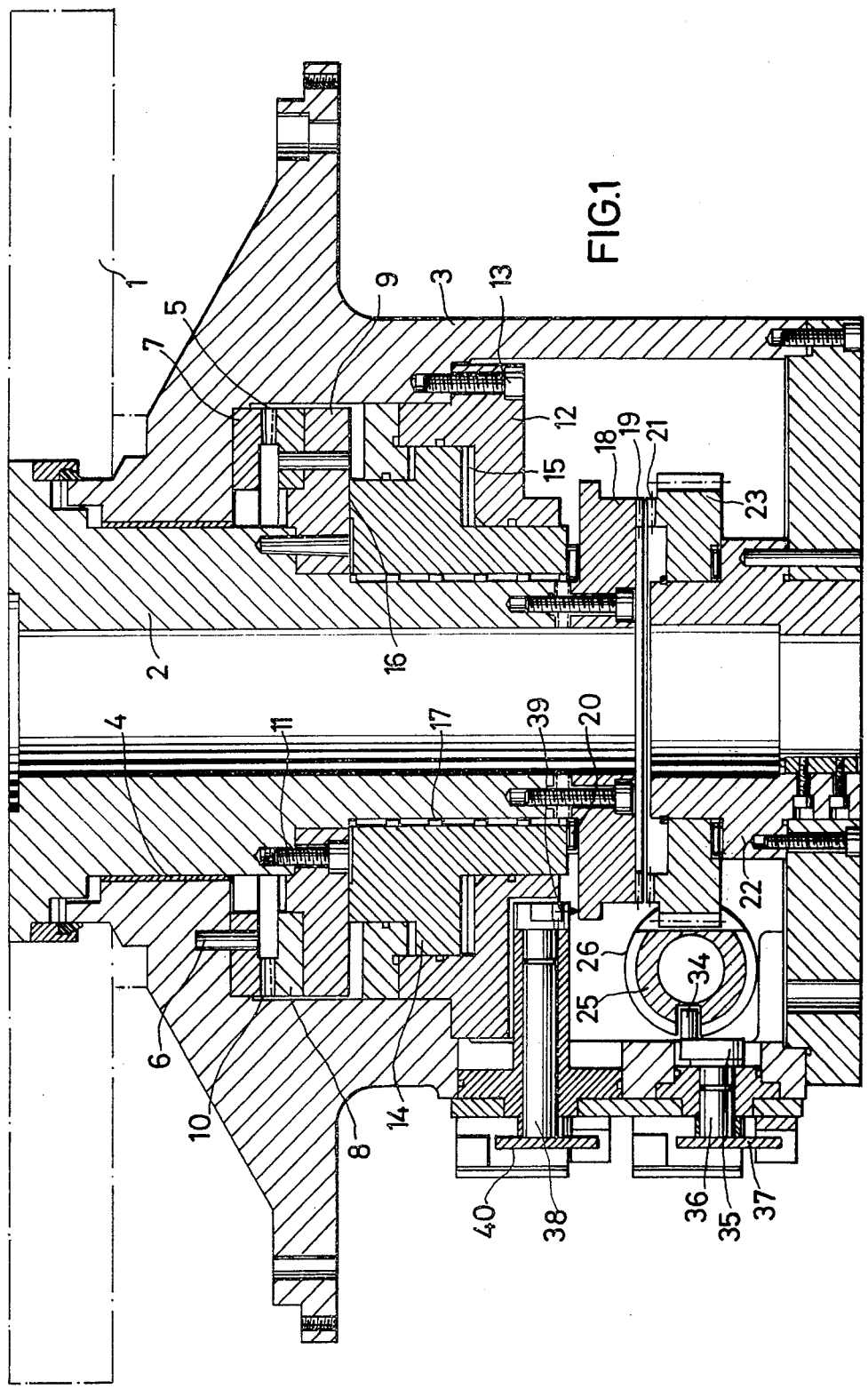
FIG. 1 is a longitudinal axial section through the indexing work table, in which the work stations have been omitted, and any parts not necessary to an understanding of the present invention have been left off, or indicated only highly schematically.

Work table 1 is secured to a central post 2 which, preferably, is tubular. The connection is rigid, so that work table 1 and post 2 rotate together, for example by welding, by rivets, bolts or the like. Post 2 is journalled in a fixed base 3, rotatable in a sleeve bearing 4. Base 3 has a self-centering locating and centering arrangement 5 therein, coaxial to the central post 2. The centering arrangement 5 includes a fixed element 7, secured to the base 3 by means of bolts (not shown) and accurately located with respect to the base 3 by means of locating pins 6. A movable part 8, secured to the post 2, can be engaged with the part 7. Part 8 is connected to the bolt 2 by means of a pressure washer 9, and locating pins similar to pin 6, as well as bolts 11, to provide accurately angularly aligned positioning of the part 8 with respect to post 2. The fixed part 7, and the movable part 8 of the centering device are formed with matching, engaging face, end, or crown gearings 10, located at gear rings. The gear ring itself is seen in FIG. 1, located radially outwardly from the central post 2 and coaxial with respect to a circle passing through a plane transverse to the major axis of post 2. The centering arrangement 5 is completely protected, beneath the base 3, so that cooling or cutting fluid splayed over the work pieces on top of the table 1 will not contaminate the angular alignment arrangement 5. Thus, the indexing and alignment arrangement 5 is completely protected from contamination or dirt. Locating the face gearing 10 at a substantial radial distance from the center of the post 2 permits placement of a large number of sub-divisions on the gear, that is, forming the gear with a high division ratio, to provide for high accuracy of locating the work table with respect to a machine tool.

A hydraulic cylinder 12 is secured by means of bolts 13 beneath the pressure plate 9 to the base 3. A hydraulic piston 14 is vertically slidably guided in the cylinder 12. The cylinder chamber 15, defined between piston 14 and cylinder 12 is supplied with hydraulic pressure fluid over a suitable line (not shown). Piston 14, at its upper face, bears with its end surface 16 against the pressure plate or washer 9. The central post 2 is journalled by means of a needle bearing 17 with respect to the hydraulic piston 14.

The lower end surface of central post 2 is secured by means of bolts to a crown or face gear disk 18, forming a clutch plate. Clutch plate 18 is coaxial to the post 2, and is formed at its lower surface with end gear teeth 19. A thrust bearing 20 axially supports the upper surface of gear or clutch plate 18 with respect to the piston 14. The end gearing 19 on clutch plate 18 is engageable with an end gearing 21 formed on a drive gear 23, and journalled in a hub 22 which, in turn, is secured to the base 3.

Drive gearing 3 is formed with outer gear teeth 24 (FIG. 3) which is engageable with rack gearing on a hydraulic piston 25, which is transversely movable, in reciprocating motion, within a hydraulic cylinder 26. Piston 25 can be moved between right and left position (FIG. 3) by means of introducing hydraulic pressure fluid against the end face surfaces, defining cylinder chambers 27, 28, respectively. The length of the stroke can be suitably selected. The introduction of hydraulic fluid into the respective cylinder chambers 27, 28 is controlled over hydraulic ducts 29, 30, connected with suitable hydraulic valves (not shown) and, in turn, connected to a suitable source of hydraulic pressure (not shown).

Figure 2:
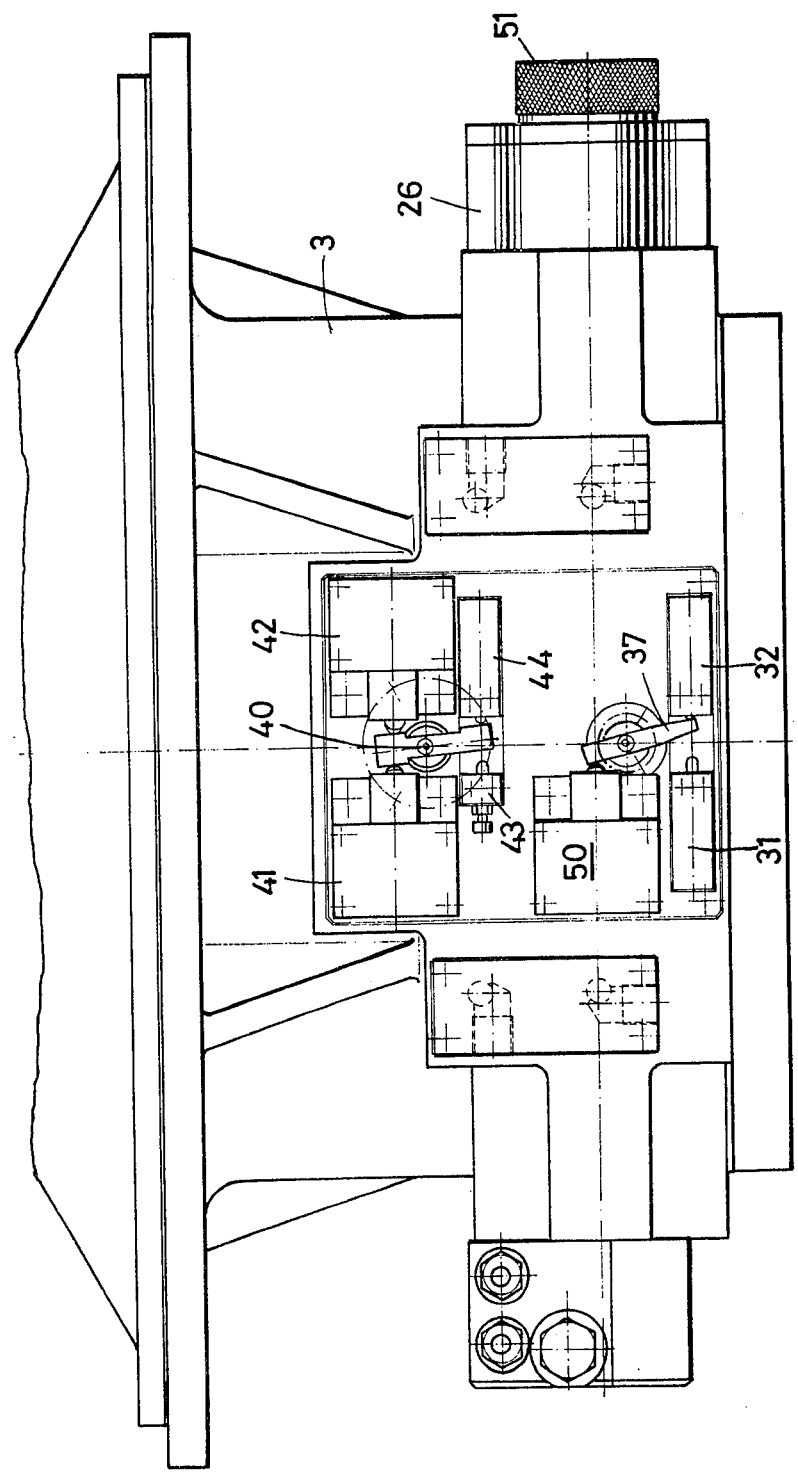
FIG. 2 is a side view of the work table according to FIG. 1, with some cover plates removed.

The hydraulic piston 25 is formed with a longitudinal slit 33 in which a pin 34 engages, seated on a crank arm 35. Crank arm 35 is rotatable over a shaft 36, located in the base 3, and extending outwardly therefrom. Shaft 36 has an operating lever 37 secured thereto (FIG. 2) which is positioned by means of spring elements 31, 32 and engages a limit sensor 50. A second shaft 38 is rotatably journalled in the base 3 above the shaft 36. Shaft 38 carries operating pins 39, coupled to the plate 18, and is connected to operating levers 40 extending through the base 3 (FIG. 2). Operating lever 40 is operatively coupled to a pair of limit sensors 41, 42, and is returned in position by means of a spring element 44 to a fixed, adjustably located abutment sensor 43. The return elements 31, 32, 44, as well as the limit sensors provide outwardly accessible indications of the position of the work table, and provide signals representative of this position to the control system for the work table, for example to provide feedback information in a closed loop servo system.

Operation: In operating position, that is, when the machine tools are to engage the work piece, the cylinder 15 has hydraulic pressure fluid applied thereto so that piston 14 is lifted by engagement of piston 14 with the pressure plate 9 secured to the central post 2, to which the indexing work table 1 is then secured. This brings the crown or end face gears 8, secured to the post, in engagement with the fixed gear part 7 of the centering device 5, so that the central post 2 can adjust itself, with high accuracy, angularly aligned with respect to the base 3, and be securely held in this angularly aligned position. The end face gearing 19 on the lower plate or disk 18 secured to post 2 is out of engagement with the end face gearing 21 of the drive gear 23, so that there is no connection between the indexing drive for the work table and the work table itself when the work table is in working, lifted position.

To index the work table, cylinder 15 is drained of pressure fluid, so that the hydraulic piston 14 can move downwardly, by gravity, that is, under the weight of the central post 2, the work table 1, and such work pieces as are placed thereon. The end gearing 10 of the centering arrangement 5 thus loses engagement; the end gearings 19, 21 of the coupling disk 18 and the drive wheel 23 are, however, engaged. The central post 2, together with the work table 1, is now coupled to the drive gear 23, and released from the centering arrangement 5. By suitable pressurizing of the cylinder chambers 27, 28 in cylinder 26, hydraulic piston 25 can be shifted, thus driving drive gear 23 and the now coupled central post 2 by a suitable angle, about its main axis. The longitudinal movement of the piston 25, and the rotary movement of the post 2 is terminated, at the latest, when the hydraulic piston 25 engages the end of the associated cylinder. The angle about which the central post 2 is rotated then corresponds approximately to the final maximum angular rotation of the work table 1. The end position of the cylinder may be adjusted, for example, by introducing an end plug, for example longitudinally adjustable by a threaded spindle coupled to manual adjustment knob 51.

When hydraulic piston 25 is stationary, cylinder 15 is again pressurized. Hydraulic piston 14 is lifted over pressure plate or washer 9, carrying along central post 2 and with it the work table 1. The end gears 19, 21 of the coupling or clutch plate 18, and of drive wheel 23 are released from engagement. During lifting of the central post 2, and with it of work table 1, the end gearings of the fixed part 7 and the movable part 8 of the centering arrangement are again engaged. The teeth of the gearing will slide into each other, to provide for gear-like engagement, permitting slight additional rotary movement of the central post 2, to effect exact angular alignment of the work table 1 with respect to the base 3. This exact angular alignment is, therefore, determined by the centering arrangement 5. The piston 14 is not rotated thereby, since bearing 17 permits rotation of the work table 1 with respect to the piston 14.

Figures 3, 3A:
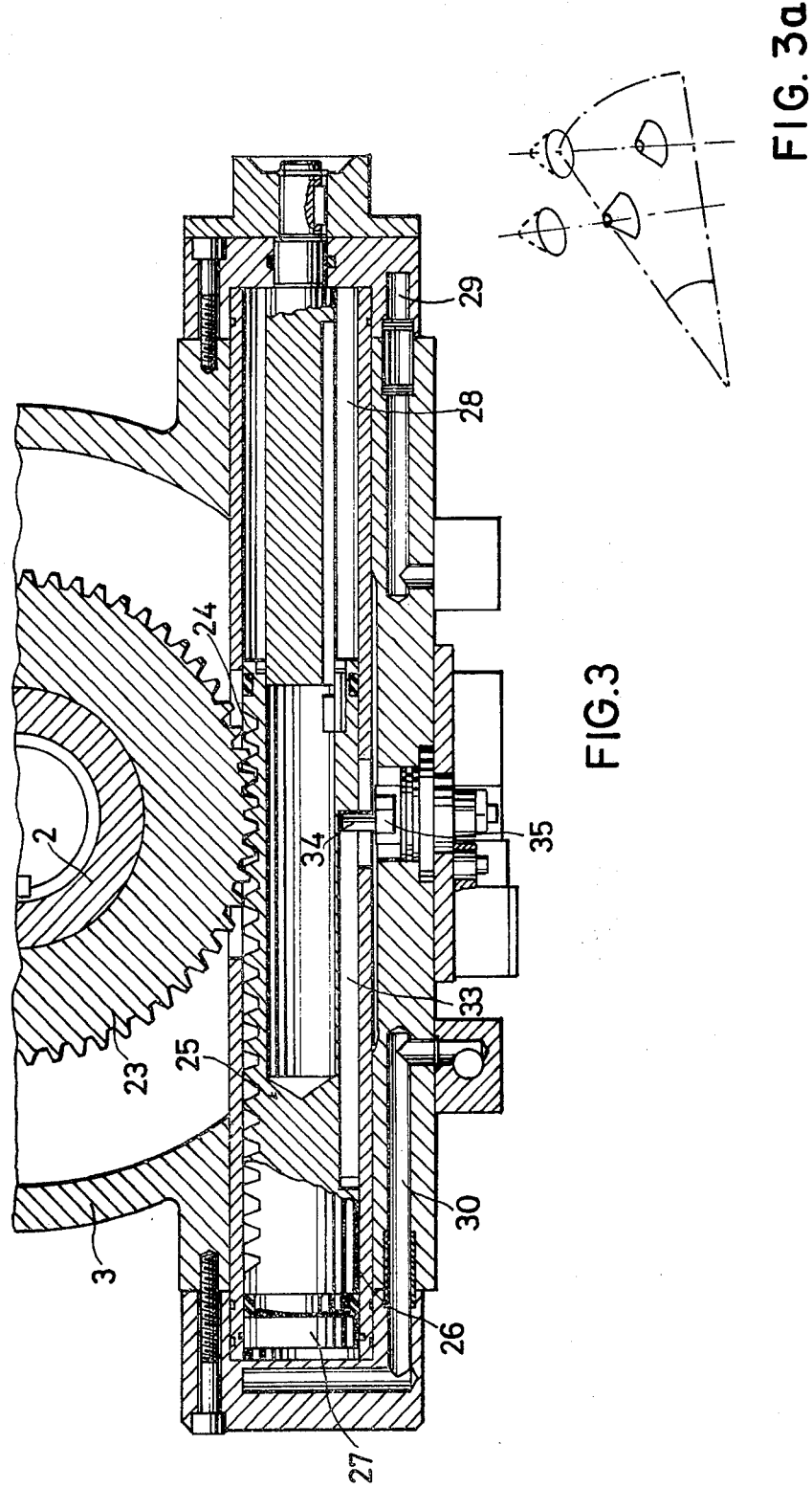
FIG. 3 is a transverse horizontal section, along line III—III of FIG. 1, of half the machine tool, illustrating the drive arrangement to index the work table, to a different scale.
FIG. 3a is a highly schematic, fragmentary exploded illustration of another embodiment of an indexing arrangement in accordance with the present invention.

The centering arrangement 5 may have various forms. As seen in FIG. 3a a plurality of projections, matching recesses, for example formed as cones, prisms, or the like, can be located at one, or more suitable arcs, surrounding the central post 2. As seen in FIG. 3a, the location of such cones, which may be truncated, may be offset radially, as well as circumferentially.

The indexing drive to rotate the central post 2 may have any suitable form, the hydraulic drive shown being one suitable example. The indexing movement may also be powered pneumatically, or electrically, as well as by a purely mechanical drive. The lifting movement of the central post 2, and with it of the indexing table 1 may also be carried out pneumatically. Additional limit switches, and sensors may be provided, for example to connect the indexing work table into a program-controlled machine tool controller.

Various changes and modifications may be made within the scope of the inventive concept.

We claim:

1. Indexing-type work table or platform (1) adapted to have work pieces secured to an upper circumference thereof comprising a base (3);

a central column or post (2) centrally supporting the table and journalled in the base (3) to rotate about the vertical axis when the table is being indexed;

drive means (23) operatively connected to the table to rotate the table for indexing motion thereof;

and means (5) locking and angularly aligning the table with respect to the base in predetermined angular positions, characterized by vertical operating means acting on the table to drop the table (1) with respect to the locking means (5) to disengage the locking means and release the table from locked engagement, in angular position, for indexing movement, and to raise the table, after indexing movement, and engage the locking and alignment means when the work pieces are to be engaged by machine tools.

2. Work table according to claim 1, wherein the locking and aligning means (5) comprises mutually engageable means formed on the table and on the base, downwardly facing on the base and upwardly facing on the table so that downward movement of the table releases engagement of said mutually engageable means.

3. Work table according to claim 2, wherein the mutually engageable means comprises tapered projection and recess means.

4. Work table according to claim 3, wherein the projection and recess means comprises matching gears formed on the table and base.

5. Work table according to claim 3, wherein the projection and recess means comprises conical or pyramidal recesses and conical or pyramidal projections fitting into the recesses.

6. Work table according to claim 1, wherein the locking and aligning means (5) comprises a fixed circular part (7) secured to the base and having a downwardly facing portion, and a movable circular part (8) secured to the table (1) and surrounding the central post (2) and having an upwardly facing portion, said portions having mutually engageable projection and recess means formed thereon for engagement in predetermined selected aligned angular positions.

7. Work table according to claim 6, wherein said facing portions of the locking and alignment means (5) are end face gears.

8. Work table according to claim 6, wherein said facing portions of the locking and alignment means are facing pyramidal, or conical projections and recesses.

9. Work table according to claim 7, wherein said locking and alignment means (5) are located on facing surface portions coaxial with said central post (2) and radially outwardly therefrom.

10. Work table according to claim 1, further comprising clutch means (18, 20) coaxial with the central post and having one clutch part (18, 19) secured thereto, the other clutch part (20, 21) being in operative connection with said drive means (23), said clutch means being engageable upon lowering of said table and hence disengagement of said locking and alignment means (5).

11. Work table according to claim 10, wherein the clutch means (18, 20) comprises an end face gear (19) secured coaxially to said post (2), a gear wheel (23) having end face gearing (21) located coaxially to the end face gear (19) and means (24, 25, 26) rotating said wheel and forming said drive means.

12. Work table according to claim 11, wherein the means rotating said wheel (23) comprises circumferential gearing (23, 24) coupled to the wheel and rack means (25) engaging said gearing.

13. Work table according to claim 1, further comprising a hydraulic piston means (14) coupled to the central post (2);
a cylinder (12) secured to the base (3) and guiding the piston (14), said piston engaging the post and hence the table or platform and holding said post, and table or platform in raised position.

14. Work table according to claim 1, further comprising a thrust bearing (20) rotatably supporting the post within the piston, and bearing means (17) rotatably locating the central post (2) within the piston, to permit independent rotation of the post during indexing movement and during fine-positioning upon engagement of the locking and alignment means (5) with respect to the piston.

* * * * *